(12) United States Patent
Planche

(10) Patent No.: US 12,354,376 B2
(45) Date of Patent: Jul. 8, 2025

(54) SYSTEMS AND METHODS FOR VISUAL INSPECTION OF SIGNAL LIGHTS AT RAILROAD CROSSINGS

(71) Applicant: Siemens Mobility, Inc., New York, NY (US)

(72) Inventor: Benjamin Planche, New Brunswick, NJ (US)

(73) Assignee: Siemens Mobility, Inc., New York, NY (US)

( * ) Notice: Subject to any disclaimer, the term of this patent is extended or adjusted under 35 U.S.C. 154(b) by 357 days.

(21) Appl. No.: 18/191,939

(22) Filed: Mar. 29, 2023

(65) Prior Publication Data

US 2024/0331404 A1 Oct. 3, 2024

(51) Int. Cl.
- *G06V 20/58* (2022.01)
- *B61L 5/18* (2006.01)
- *G06V 10/44* (2022.01)
- *G06V 10/82* (2022.01)

(52) U.S. Cl.
CPC ............ *G06V 20/584* (2022.01); *B61L 5/18* (2013.01); *G06V 10/454* (2022.01); *G06V 10/82* (2022.01)

(58) Field of Classification Search
CPC .... G06V 20/584; G06V 10/454; G06V 10/82; B61L 5/18
See application file for complete search history.

(56) References Cited

U.S. PATENT DOCUMENTS

| | | | |
|---|---|---|---|
| 11,249,487 B2* | 2/2022 | Hsiao | G06N 20/00 |
| 2005/0232469 A1* | 10/2005 | Schofield | B60W 30/143 |
| | | | 382/104 |
| 2013/0229520 A1* | 9/2013 | Aimura | G06V 20/584 |
| | | | 348/148 |
| 2018/0309963 A1* | 10/2018 | Schofield | G08G 1/166 |
| 2020/0047785 A1* | 2/2020 | Fries | B61L 23/007 |
| 2020/0133292 A1* | 4/2020 | Hsiao | G05D 1/0088 |
| 2021/0261152 A1* | 8/2021 | Meijburg | B60W 60/001 |

(Continued)

OTHER PUBLICATIONS

Zakharov Sergey et al: "3D object instance recognition and pose estimationusing triplet loss with dynamic margin", 2017 IEEE/RSJ International Conference on Intelligent Robots and Systems (IROS), pp. 552-559, XP055435885, DOI: 10.1109/IROS.2017.8202207; ISBN: 978-1-5386-2682-5, the whole document; Abstract, Figures 2,4, Table III, section III.A, III.B, III.D, IV.A.

(Continued)

*Primary Examiner* — Utpal D Shah

(57) ABSTRACT

A system for visual inspection of signal lights at a railroad crossing includes a data source comprising a stream of images, the stream of images including images of signal lights at a railroad crossing, an inspection module configured via computer executable instructions to receive the stream of images, detect signal lights and light instances in the stream of images, encode global information relevant to ambient luminosity and return a first feature vector, encode patch information of luminosity of detected signal lights and return a second feature vector, concatenate the first feature vector with the second feature vector and return a concatenated feature vector, and decode the concatenated feature vector and provide status of the signal lights.

20 Claims, 5 Drawing Sheets

(56) References Cited

U.S. PATENT DOCUMENTS

2022/0245949 A1* 8/2022 Marin ................... G06V 10/82
2024/0083478 A1* 3/2024 Liu ....................... G06V 20/52

OTHER PUBLICATIONS

Wohlhart Paul et al: "Learning descriptors for object recognition and 3Dpose estimation", 2015 IEEE Conference on Computer Vision and Attern Recognition (CVPR), IEEE, pp. 3109-3118, XP032793759, DOI: 10.1109/CVPR.2015.7298930; [gefunden am Oct. 14, 2015], Abstract pp. 3111, left column, Section 3-pp. 3113, right column, fourth paragraph, figure 1; DOI: 10.1109/CVPR.2015.7298930, the whole document.

* cited by examiner

SYSTEMS AND METHODS FOR VISUAL INSPECTION OF SIGNAL LIGHTS AT RAILROAD CROSSINGS

BACKGROUND

1. Field

Aspects of the present disclosure generally relate to systems and methods for visual inspection of signal lights at railroad crossings.

2. Description of the Related Art

In the U.S. alone, there are more than 59,000 equipped railroad crossings. To ensure safety of railroad crossings, crossing control system including signal control equipment are installed at crossings. The control systems and signal control equipment need to be inspected on a regular basis. Due to regulations, these inspections must be done at least every 4 weeks. There is already some automatic monitoring, e.g., electric power availability, but most of maintenance and inspection is currently being performed manually, with railroad operators having to drive to and check crossings one by one.

Among other tasks, a visual inspection of railroad crossings consists of checking proper functioning of the various traffic lights. When a train is incoming till after the train passed, the lights should either blink according to specific patterns (e.g., alternative blinking with 1 Hz frequency for the pairs of flasher lights) or be ON continuously (e.g., the lights mounted on the tip of each gate). Moreover, visibility of the lights should also be checked during inspection, i.e., making sure that each light is not dimmed, e.g., due to accumulation of dirt or wear of the light bulb.

Evaluating the brightness of these traffic lights (i.e., to check when they are ON or OFF and to evaluate their visibility) can be a challenging task, due to their small size and due to ambiguities related to luminosity. Even to the human eye, when observing images from the cameras installed at crossings, it can be hard to measure if a light is ON or if it is just reflecting other external light sources (sunlight, lights from traffic, etc.). While deep-learning solutions may be adopted to try solving this prediction task, gathering the proper labels for training would be an extremely tedious task (implying to manually annotate the light status of each light instance, in each video frame).

Current maintenance and inspection systems for railroad crossings are mostly based on:
Passive monitoring from electric sensors, e. g., alerting railroad companies in case of power failure or power instability impacting one or more equipment instances.
Manual inspection, e. g., operators driving to each railroad crossing and visually inspecting the proper functioning of the different equipment instances.

SUMMARY

A first aspect of the present disclosure provides a system for visual inspection of signal lights at a railroad crossing, the system comprising a data source comprising a stream of images, the stream of images including images of signal lights at a railroad crossing, an inspection module configured via computer executable instructions to receive the stream of images, detect signal lights and light instances in the stream of images, encode global information relevant to ambient luminosity and return a first feature vector, encode patch information of luminosity of detected signal lights and return a second feature vector, concatenate the first feature vector with the second feature vector and return a concatenated feature vector, and decode the concatenated feature vector and provide status of the signal lights.

A second aspect of the present disclosure provides a method for visual inspection of signal lights at a railroad crossing, the method comprising, through operation of at least one processor and at least one memory, receiving a stream of images, detecting signal lights and light instances in the stream of images, encoding global information relevant to ambient luminosity and return a first feature vector, encoding patch information of luminosity of detected signal lights and return a second feature vector, concatenating the first feature vector with the second feature vector and return a concatenated feature vector, and decoding the concatenated feature vector and providing status of the signal lights.

A third aspect of the present disclosure provides a non-transitory computer readable medium storing executable instructions that when executed by a computer perform a method for visual inspection of signal lights at a railroad crossing as described herein.

DETAILED DESCRIPTION

To facilitate an understanding of embodiments, principles, and features of the present disclosure, they are explained hereinafter with reference to implementation in illustrative embodiments. In particular, they are described in the context of being systems and methods for visual inspection of signal lights at railroad crossings. Embodiments of the present disclosure, however, are not limited to use in the described devices or methods.

The components and materials described hereinafter as making up the various embodiments are intended to be illustrative and not restrictive. Many suitable modules, elements, components and materials that would perform the same or a similar function as described herein are intended to be embraced within the scope of embodiments of the present disclosure.

Figure 1:
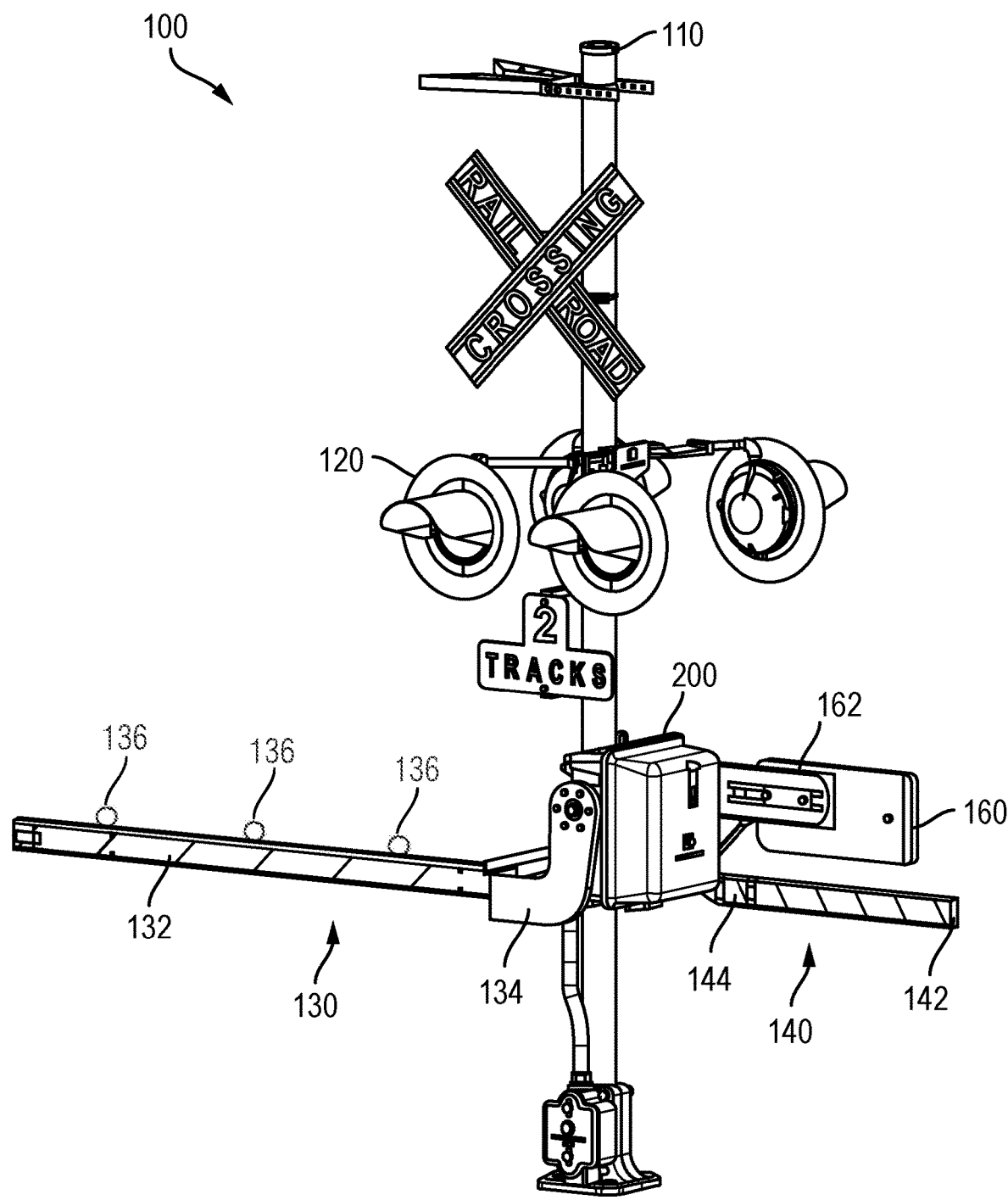
FIG. 1 illustrates an example railroad crossing gate in accordance with an exemplary embodiment of the present disclosure.

FIG. 1 illustrates a railroad crossing gate 100 in a lowered or horizontal position. At many railroad crossings, at least one railroad crossing gate 100 may be placed on either side of the railroad track to restrict roadway traffic in both directions. At some crossings, pedestrian paths or sidewalks may run parallel to the roadway. To restrict road and sidewalk traffic, the illustrated railroad crossing gate 100 includes a separate roadway gate 130 and pedestrian gate 140. The roadway gate 130 and pedestrian gate 140 may be raised and lowered, i. e. operated, by control mechanism 200.

The example railroad crossing gate 100 also includes a pole 110 and (flashing) signal lights 120, herein also referred to as flasher lights. The gate control mechanism 200 is attached to the pole 110 and is used to raise and lower the roadway and pedestrian gates 130, 140. The illustrated railroad crossing gate 100 is often referred to as a combined crossing gate. When a train approaches the crossing, the railroad crossing gate 100 may provide a visual warning using the signal lights 120. The gate control mechanism 200 will lower the roadway gate 130 and the pedestrian gate 140 to respectively restrict traffic and pedestrians from crossing the track until the train has passed.

As shown in FIG. 1, the roadway gate 130 comprises a roadway gate support arm 134 that attaches a roadway gate arm 132 to the gate control mechanism 200. The gate arm 134 comprises multiple gate arm lamps 136. When a train approaches the crossing, the signal lights 120 and the gate arm lamps 136 will flash according to their specific requirements. Similarly, the pedestrian gate 140 comprises a pedestrian gate support arm 144 connecting a pedestrian gate arm 142 to the gate control mechanism 200. When raised, the gates 130 and 140 are positioned so that they do not interfere with either roadway or pedestrian traffic. This position is often referred to as the vertical position. A counterweight 160 is connected to a counterweight support arm 162 connected to the gate control mechanism 200 to counterbalance the roadway gate arm 132. Although not shown, a long counterweight support arm could be provided in place of the short counterweight support arm 134.

Typically, the gates 130, 140 are lowered from the vertical position using an electric motor contained within the gate control mechanism 200. The electric motor drives gearing connected to shafts (not shown) connected to the roadway gate support arm 134 and pedestrian gate support arm 144. The support arms 134, 144 are usually driven part of the way down by the motor (e.g., somewhere between 70 and 45 degrees) and then gravity and momentum are allowed to bring the arms 132, 142 and the support arms 134, 144 to the horizontal position. In another example, the support arms 134, 144 are driven all the way down to the horizontal position by the electric motor of the gate control mechanism 200.

Figure 2:
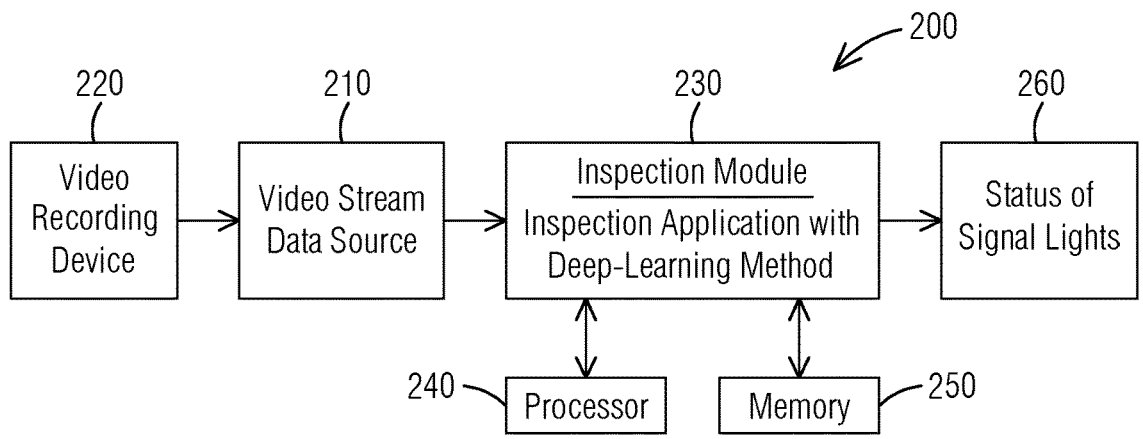
FIG. 2 illustrates a schematic of a system for visual inspection of signal lights at a railroad crossing in accordance with an exemplary embodiment of the present disclosure.

FIG. 2 illustrates a schematic of a system 200 for visual inspection of signal lights at a railroad crossing in accordance with an exemplary embodiment of the present disclosure.

Signal lights at a railroad crossing comprise two types of lights. As described for example with reference to FIG. 1, the crossing includes flasher lights 120 mounted on a pole or post 110. Further, the crossing gate arm 134 comprises multiple gate arm lights 136. The signal lights 120, 136 are fixed or mounted on a barrier, and they flash (turn on/off) in operation. An inspection of the signal lights 120, 134 includes that the lights should be flashing or be continuously on when a train passes. Further, the signal lights should be visible from the road, i. e., no dirt, obstacles, rotation etc. The crossing gate arms 134 are composed of red-white segments and move down and up. An inspection of the gate arms 134 include that the gate arms are of proper length, i. e., not broken, bent etc., and that they move synchronously down and up.

An automated (visual) inspection poses several challenges. Not only do most of the target lights, such as gate lights 136, cover few pixels in the images due to their small size, but ambiguities with respect to apparent brightness must also be considered and solved. For example, even though the highlighted flasher light appears bright due to sunlight reflection, it is actually OFF.

Systems and methods are proposed including a deep-learning method to predict brightness of signal lights, specifically signal lights installed at railroad crossings, without a need for manual annotations.

In general, according to embodiments of the present disclosure, a railroad crossing is equipped with one or more video recording devices, such as for example video camera(s), wherein a video stream is recorded at least for the duration that a train travels through the crossing. The recorded video stream is then analyzed for functionality and brightness of the signal lights. If failures of the signal lights are detected, an alarm is generated to trigger a human inspection, e. g. inspection by train personnel.

With reference to FIG. 2, the system 200 comprises a data source 210 comprising a stream of images, the stream of images including images of signal lights at a railroad crossing. More specifically, the data source is a video stream data source 210, wherein the video stream is provided by video recording device 220, such as a video camera that is installed at the railroad crossing such that video(s) of the crossing, and specifically the signal lights, are recorded when one or more trains pass and travel through the crossing.

Further, the system 200 comprises an inspection module 230, a processor 240 and a memory 250. The inspection module 230 is configured via computer executable instructions, and through operation of the processor 240 and memory 250, to receive, process and analyze the video stream, provided by data source 210. As a result, status 260 (ON or OFF) of the signal lights are output by the inspection module 230, i. e. whether the signal lights function properly as required.

The inspection module 230 may be embodied as software or a combination of software and hardware. The inspection module 230 may be a separate module or may be an existing module programmed to perform a method as described herein. For example, the inspection module 230 may be incorporated, for example programmed, into an existing monitoring system, by means of software.

Figure 3:
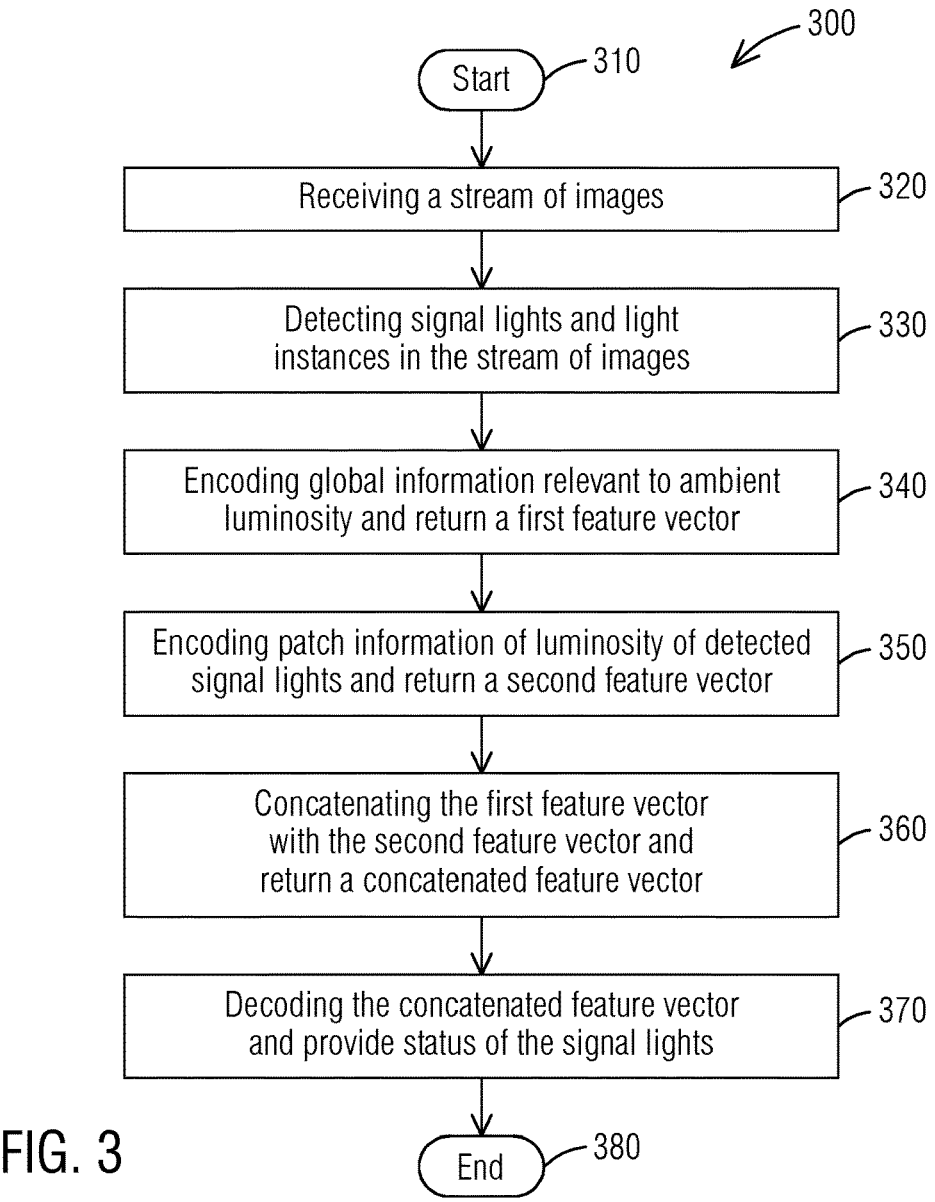
FIG. 3 illustrates a flow chart of a method for visual inspection of signal lights at a railroad crossing in accordance with embodiments of the present disclosure.

FIG. 3 illustrates a flow chart of a method 300 for visual inspection of signal lights at a railroad crossing in accordance with embodiments of the present disclosure. While the method 300 is described as a series of acts or steps that are performed in a sequence, it is to be understood that the method 300 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 300 may start at 310 and comprises, through operation of inspection module 230 and processor 240, act 320 of receiving a stream of images, act 330 of detecting signal lights and light instances in the stream of images, act 340 of encoding global information relevant to ambient luminosity and return a first feature vector, act 350 of encoding patch information of luminosity of detected light instances and return a second feature vector, act 360 of concatenating the first feature vector with the second feature vector to provide a concatenated feature vector, and act 370 of decoding the concatenated feature vector and providing status of the signal lights. At 380 the method may end.

The method 300 with its method acts will be described in more detail with reference to FIG. 4, FIG. 5, and FIG. 6.

Figure 4:
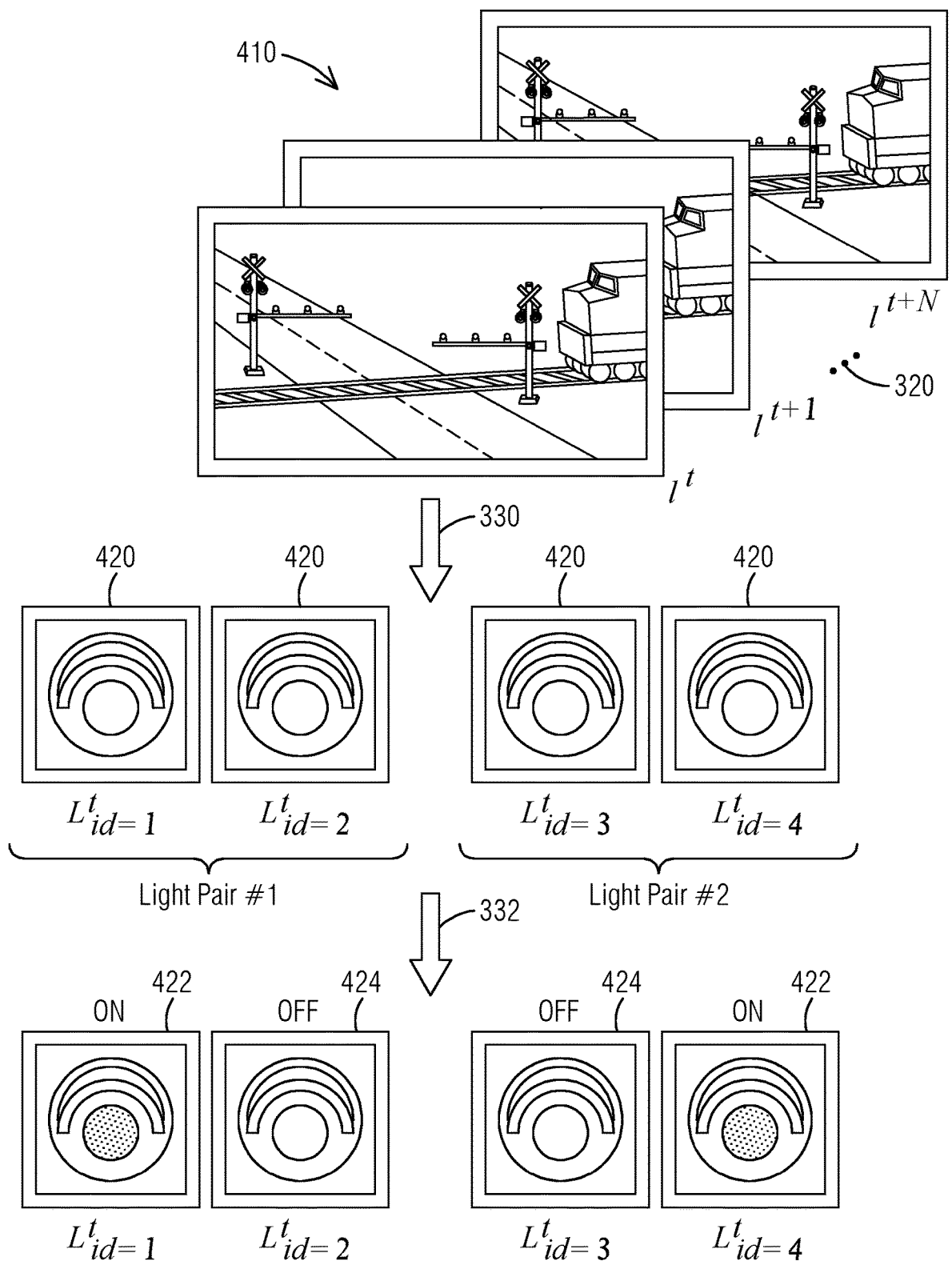
FIG. 4 illustrates a schematic of detection and auto-labeling of light instances in accordance with an exemplary embodiment of the present disclosure.

FIG. 4 illustrates a schematic of detection and auto-labeling of light instances in a video stream in accordance with an exemplary embodiment of the present disclosure.

Detection of Signal Lights and Light Instances

The proposed method 300 to predict the status, e. g. brightness, of each signal light is based on video frames of the video stream data source 210. Light instances of the signal lights are detected in the video frames (images). In an embodiment, a convolutional neural network (CNN) detects each light instances from input images, returning a bounding box or patch corresponding to each light. It should be noted that other detection neural networks, e. g., Fast-RCNN or YOLO, or other methods, e. g., hard-coded segmentation for static lights with static camera, can be used for act 330 of detecting signal lights and light instances.

In an embodiment, a video camera facing one side of a railroad crossing returns a video stream 410 with video frames $I^t, I^{t+1} \ldots I^{t+2}$. Utilizing a first CNN, a list of patches 420 of signal lights is detected. In our example, we have 4 patches $\{L_{id=i}^t\}_{i=1}^4$ corresponding to 4 flasher lights.

Auto-Labeling of Training Data

During a training phase 332 only, each light instance is automatically labeled with its binarized (binary) status ON or OFF. Instead of requiring manual annotation of light status, expert knowledge is utilized to automate the process. For example, it is known that railroad crossings have pairs of flasher lights on each side of the road (see for example flasher lights 120 in FIG. 1). Whenever a train arrives (timestamp information available from railroad company), each flasher in a pair starts flashing, wherein the lights of the respective pair flash in an alternating manner. That means, that until the train has passed (timestamp also available), within each frame, it is known that if two flasher lights are side by side, one should be ON and the other should be OFF. It is also known that pairs of flashers on opposite sides of the road flash in opposite patterns, i. e., if the $L_{id=1}^t$ left flasher of the pair on the left-side of the road is ON, then $L_{id=3}^t$ the left flasher of the pair on the right-side of the road is OFF. Accordingly, as shown in FIG. 4, patches 422 of flasher lights are labeled ON, whereas patches 424 are labeled OFF.

Based on the above, a training data set can be built as follows (assuming the video stream and video frames do not contain any light anomaly, e.g., light not working):

- Timestamps are used to filter/keep only the video segments when trains are crossing, and the signal lights are operating (ON/OFF).
- For each video frame, pairs of flasher lights are created based on their positions in the image (returned by detection step), see light pair #1 and light pair #2 in FIG. 4.
- Opposite labels are assigned to each signal light in each light pair.
- It is not known which flasher light is actually ON, and which light is actually OFF. However, it is known that patches 422 ($L_{id=1}^t$ and $L_{id=4}^t$) have the same label, and patches 424 ($L_{id=2}^t$ and $L_{id=3}^t$) have the same label.

The same applies to the gate arm lights 136, with exception of the tip light, which is continuously ON; the other lights mounted on a gate arm flash in an alternating manner, thus, making it possible to auto-label all of them.

Figure 5:
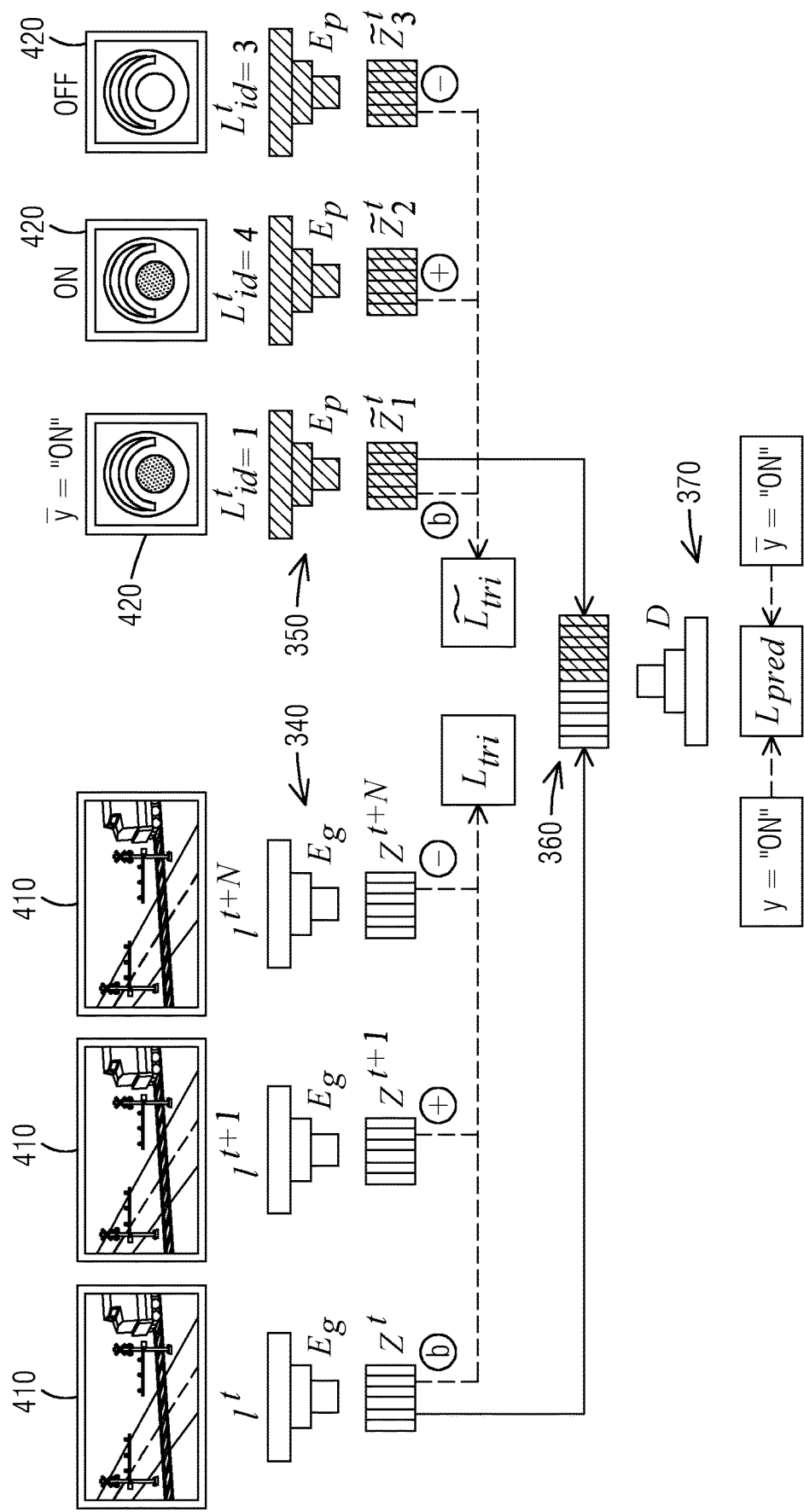
FIG. 5 illustrates a schematic of training encoders and decoders to predict light status in accordance with an exemplary embodiment of the present disclosure.

FIG. 5 illustrates a schematic of training encoders and decoders to predict light status in accordance with an exemplary embodiment of the present disclosure.

Encoding of Light Information

For the encoding steps 340, 350, a machine-learning concept named triplet method is utilized. According to the triplet method, a convolutional neural network (CNN) is trained to extract relevant features from an image and encode the features into a low-dimensional feature vector, with an embedding space of low-dimensionality, e. g., mapping the images to a descriptor space where instances of different classes or status are well separated. The feature vectors representing known images are stored along with their respective labels, i. e., the object class for the task of object retrieval, so that given a new image, the CNN can be used to extract its corresponding feature vector and compare it with stored vectors for recognition.

To learn discriminative features, the method applies a triplet loss function to the training of the CNN noted $T_{\theta_T}$: $x \rightarrow z$, with $\theta_T$ as trainable parameters. A triplet is defined as $(x_b, x_+, x_-)$ with $x_b$ as an input image, from the training dataset, used as binding anchor representing a specific class/status $y_b$, wherein $x_+$ is a positive image similar to $x_b$ in terms of label (similar class/status $y_+=y_b$), and $x_-$ is a negative sample with dissimilar content (different class/status $y_-$). The triplet loss function is designed to force the CNN to extract features similar for $x_b$ and $x_+$ and dissimilar for $x_b$ and $x_-$:

$$\mathcal{L}_{tri}(\theta_T) = \sum_{(x_b, x_+, x_-) \in X_s^3} \max\left(0, 1 - \frac{\|T_{\theta_T}(x_b) - T_{\theta_T}(x_-)\|_2^2}{\|T_{\theta_T}(x_b) - T_{\theta_T}(x_+)\|_2^2 + \epsilon}\right)$$

Here, $\epsilon$ is a small margin setting a minimum ratio for a distance between similar and dissimilar pairs of samples.

Once trained, the method $T_{\theta_T}$ is used to compute the feature vectors of a subset of $X_s$. These vectors can either be used as keys to index the labels of samples and to form a feature-descriptor database, or they can directly be passed to downstream CNNs for further processing.

The triplet method is described in more detail for example in non-patent literature document "Learning Descriptors for Object Recognition and 3D Pose Estimation" by P. Wohlhart and V. Lepetit (2015).

Encoding of Global Information (Per Video Frame)

A first CNN $E_g$ receives the full input images, e. g., video frames 410, extracts information relevant to the ambient luminosity, and returns a first feature vector $z^t, z^{t+1}$ and $z^{t+2}$. The first CNN $E_g$ is trained over full video frames 410 to extract features relevant to the overall/ambient luminosity. During training, $E_g$ receives triplets composed of two similar video frames $I^t, I^{t+1}$, and one dissimilar video frame $I^{t+2}$. The similar video frames are obtained consecutively, whereas the dissimilar video frame is picked randomly from the video stream, at the time stamp t+N with N large enough so that the ambient luminosity is different.

Encoding of Patch Information (Per Light Instance)

A second encoding CNN $E_p$ receives the patches 420 corresponding to a detected light (separately), extracts feature(s) relevant to the luminosity of the corresponding light and returns a second feature vector $\tilde{z}_1^t, \tilde{z}_2^t$ and $\tilde{z}_3^t$. The CNN $E_p$ is trained to extract relevant features for each image patch 420 containing a detected light instance. During training, $E_g$ receives triplets composed of two similar light patches and one dissimilar light patch. The similar patches are patches that are extracted from the same frame $I^t$ and that corresponds to lights having been auto labeled with the same status (while not knowing if that status corresponds to ON or OFF). The dissimilar patch also comes from the same frame $I^t$ but should have received the opposite value during auto-labeling.

As a result, each CNN is trained to extract features relevant to the luminosity, either of the overall image (image frames 410) or of the detected lights (patches 420).

Decoding of Feature Vectors into Predictions

For each detected light instance $L_i^t$ in a video frame, the corresponding feature vector $\tilde{z}_1^t$ (second feature vector) obtained from $E_p$ is concatenated (linked) with the corresponding global feature vector $z^t$ (first feature vector) from $E_g$.

The resulting feature vector (concatenated feature vector) is then forwarded to a decoder network D that predicts the status of the signal light. D is trained by comparing its output values with the values of the auto-labeled light instances (patches). A loss $\mathcal{L}_{pred}$ can also be backpropagated all the way back to the other networks ($E_g$ and $E_p$) to provide additional supervision for their training.

Figure 6:
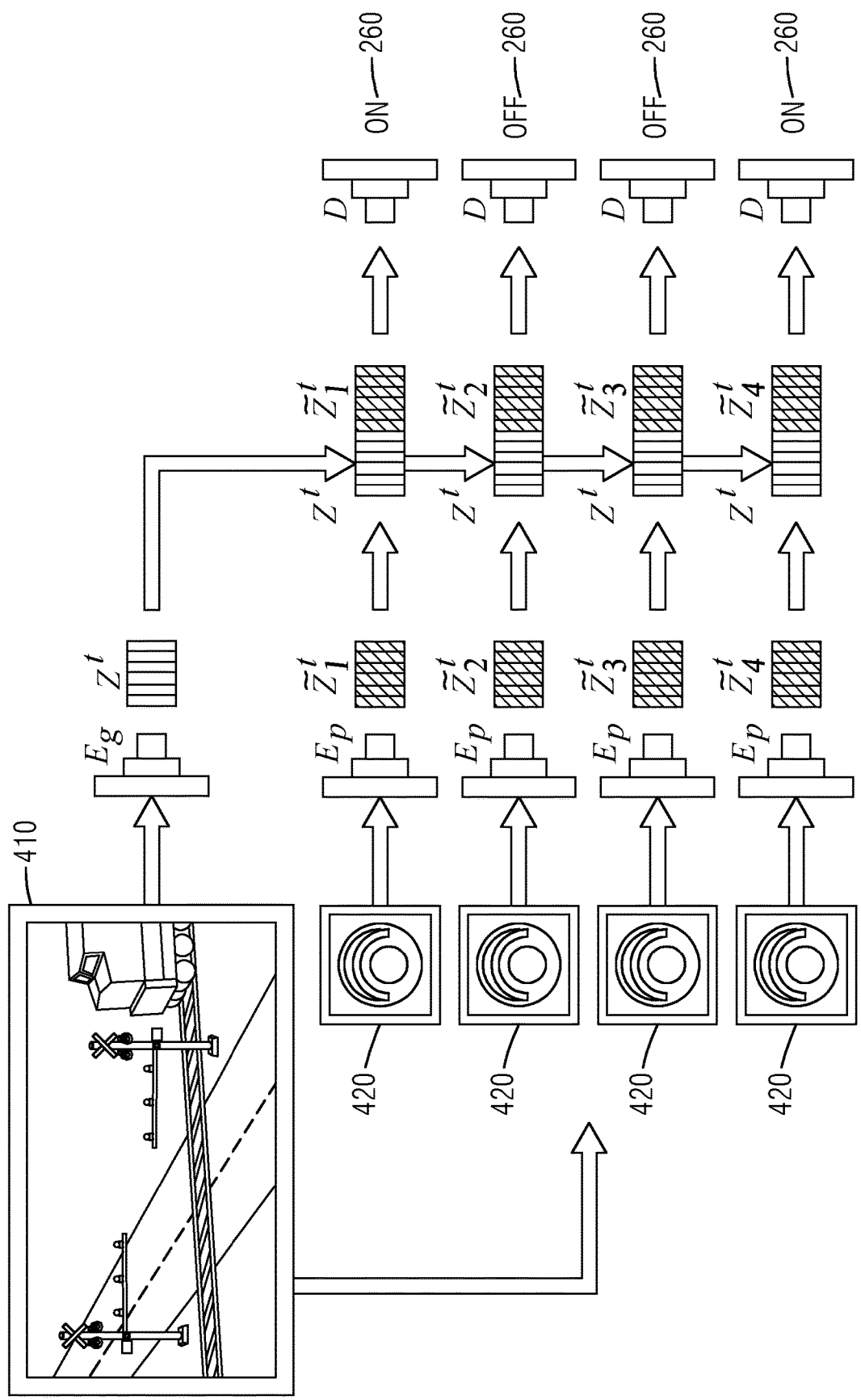
FIG. 6 illustrates a schematic of inference in accordance with an exemplary embodiment of the present disclosure.

FIG. 6 illustrates a schematic of an application of the method 300 in accordance with an exemplary embodiment of the present disclosure. More specifically, FIG. 6 illustrates how inference is performed after deployment of the solution (method 300), but without the triplet scheme and losses which are only relevant for training.

Video stream 410 with video frames is recorded and provided by video stream recording device 220, such as a video camera. Corresponding to the number of signal lights, patches 420 of the signal lights are detected. In our example, we have 4 patches corresponding to 4 flasher lights.

The first CNN $E_g$ receives the full input images, e. g., video frames 410, extracts information relevant to the ambient luminosity, and returns a first feature vector $z^t$. The first CNN $E_g$ is trained over full video frames 410 to extract features relevant to the overall/ambient luminosity.

The second encoding CNN $E_p$ receives the patches 420 corresponding to a detected light (separately), extracts feature(s) relevant to the luminosity of the corresponding light and returns a second feature vector $\tilde{z}_1^t, \tilde{z}_2^t, \tilde{z}_3^t$ and $\tilde{z}_4^t$. The CNN $E_p$ is trained to extract relevant features for each image patch 420 containing a detected light instance. The CNNs $E_g$ and $E_p$ are trained to extract features relevant to the luminosity, either of the overall image (image frames 410) or of the detected lights (patches 420).

As described earlier, for each detected light instance in a video frame, the corresponding feature vector $\tilde{z}_1^t$ (second feature vector) obtained from $E_p$ is concatenated (linked) with the corresponding global feature vector $z^t$ (first feature vector) from $E_g$. The resulting feature vector (concatenated feature vector) is then forwarded to a decoder network D that predicts the status 260 of the signal light. D is trained by comparing its output values with the values of the auto-labeled light instances (patches).

The described system 200 and method 300 provide a self-supervised deep-learning solution for the visual inspection of railroad crossing lights, including integration of an auto-labeling scheme based on expert knowledge to circumvent the need for manual annotations, therefore facilitating training at scale. Further, the dual application of the triplet method considers both local and global luminosity features to solve ambiguous lighting conditions. For example, the triplet method helps to the CNNs to focus on discriminative features, e. g. what makes different patches/images similar or dissimilar with respect to a task. It better structures the intermediate feature space that the predictive function relies on.

Further, features of the whole image and features extracted from patches are concatenated and computed, because the task of predicting the status of a specific flasher light varies a lot depending on the context. For example, it is much easier to know whether a light is on at night (bright light against dark background), whereas, when the sun is setting thereby creating strong reflections against the light bulbs that could be falsely interpreted as the lights being on, the predictive function needs to focus on much more subtle signals to figure out its status. Therefore, the small patches may not provide enough context to predict the light status for sure. Features from the whole image help solving and disentangling the problem.

The invention claimed is:

1. A system for visual inspection of signal lights at a railroad crossing, the system comprising:
    a data source comprising a stream of images, the stream of images including images of signal lights at a railroad crossing,
    an inspection module configured via computer executable instructions to receive the stream of images,
        detect signal lights and light instances in the stream of images,
        encode global information relevant to ambient luminosity and return a first feature vector,
        encode patch information of luminosity of detected signal lights and return a second feature vector,
        concatenate the first feature vector with the second feature vector and return a concatenated feature vector, and
        decode the concatenated feature vector and provide status of the signal lights.

2. The system of claim 1, further comprising:
    at least one video recording device, wherein the stream of images is recorded by the at least one video recording device.

3. The system of claim 2,
    wherein the at least one video recording device comprises one or more video cameras, configured to be installed at the railroad crossing.

4. The system of claim 1,
    wherein the inspection module utilizes a first convolution neural network (CNN) to encode the global information relevant to ambient luminosity and return a first feature vector.

5. The system of claim 4,
    wherein the first CNN is trained with full video frames to extract features relevant to the ambient luminosity.

6. The system of claim 1,
    wherein the inspection module utilizes a second CNN to encode patch information of luminosity of detected signal lights and light instances and return a second feature vector.

7. The system of claim 6,
    wherein the second CNN is trained with image patches to extract features of detected light instances.

8. The system of claim 1,
    wherein the inspection module utilizes one or more CNN(s), wherein the CNN(s) are trained with a triplet loss function.

9. The system of claim 1,
    wherein the inspection module utilizes a decoder network to decode the concatenated feature vector and provide status of the signal lights.

10. The system of claim 9,
    wherein the decoder network is a third CNN.

11. A method for visual inspection of signal lights at a railroad crossing, the method comprising, through operation of at least one processor and at least one memory:
  receiving a stream of images,
  detecting signal lights and light instances in the stream of images,
  encoding global information relevant to ambient luminosity and return a first feature vector,
  encoding patch information of luminosity of detected signal lights and return a second feature vector,
  concatenating the first feature vector with the second feature vector and return a concatenated feature vector, and
  decoding the concatenated feature vector and providing status of the signal lights.

12. The method of claim 11, further comprising:
  recording the stream of images by at least one video recording device.

13. The method of claim 12,
  wherein the at least one video recording device comprises one or more video cameras, configured to be installed at the railroad crossing.

14. The method of claim 11,
  wherein the encoding of the global information comprises utilizing a first convolution neural network (CNN).

15. The method of claim 14, further comprising:
  training the first CNN with full video frames to extract features relevant to the ambient luminosity.

16. The method of claim 15,
  wherein the training comprises utilizing a triplet loss function.

17. The method of claim 11,
  wherein the encoding of the patch information comprising utilizing a second CNN.

18. The method of claim 17, further comprising:
  training the second CNN with image patches to extract features of detected light instances.

19. The method of claim 18,
  wherein the training comprises utilizing a triplet loss function.

20. A non-transitory computer readable medium storing executable instructions that when executed by a computer perform a method for visual inspection of signal lights at a railroad crossing as claimed in claim 11.

* * * * *